United States Patent [19]

Schrader

[11] 4,278,486

[45] Jul. 14, 1981

[54] METHOD AND APPARATUS FOR CORRUGATING PAPERBOARD

[76] Inventor: Edward H. Schrader, 306 Ross, Mart, Tex. 76664

[21] Appl. No.: 681,732

[22] Filed: Apr. 29, 1976

[51] Int. Cl.³ .................... B32F 1/36

[52] U.S. Cl. .................... 156/231; 156/205; 156/210; 156/234; 156/235

[58] Field of Search .................... 156/205, 206, 208, 210, 156/289, 231; 100/93 RP, 174

[56] References Cited

U.S. PATENT DOCUMENTS

| | | | |
|---|---|---|---|
| 1,796,542 | 3/1931 | Schoo | 156/205 |
| 2,029,390 | 2/1936 | Rodgers | 264/136 |
| 3,004,880 | 10/1961 | Lord | 156/210 |
| 3,103,459 | 9/1963 | Kane | 264/286 |
| 3,676,247 | 7/1972 | Morris et al. | 156/205 |
| 3,834,961 | 9/1974 | Terry | 156/289 |
| 3,849,224 | 11/1974 | Hintz et al. | 156/208 |
| 3,892,613 | 7/1975 | McDonald et al. | 156/205 |

FOREIGN PATENT DOCUMENTS 2336592 1/1975 Fed. Rep. of Germany .

OTHER PUBLICATIONS

Hackh's Chemical Dictionary, McGraw Hill, 4th Ed., pp. 306, 435, 616 (1969).

*Primary Examiner*—John T. Goolkasian
*Assistant Examiner*—W. H. Thrower
*Attorney, Agent, or Firm*—Bard & Groves

[57] ABSTRACT

In a preferred embodiment of the present invention, a web of a corrugating medium is supplied to heated corrugating rolls to which a water mist carrying a solid lubricant as a release agent has been applied evenly over the roller, a first linerboard is glued to one side of the corrugated medium, a second linerboard is passed over a preheating roller to which a solid lubricant is applied via a water suspension sprayed on the preheating roller, the second linerboard is glued to the single faced corrugated board and the resulting double faced corrugated paperboard is passed over a hot plate section while subjected to pressure from a belt and weight roller assembly from above the hot plate.

8 Claims, 2 Drawing Figures

METHOD AND APPARATUS FOR CORRUGATING PAPERBOARD

BACKGROUND OF THE INVENTION

This invention relates to a method and apparatus for forming corrugated paperboard and more particularly to a method and apparatus for forming corrugated paperboard at a high rate of speed and of high quality.

Systems currently in use for forming corrugated paper board employ corrugating rollers for corrugating a corrugating medium, generally paper drawn off of a roll, to form a corrugated layer. In order to facilitate corrugation and to ensure that corrugations are formed and retain their shape, the paper is generally conditioned by the application of one or more steam showers applied upstream of the corrugating rollers. The corrugating medium is passed through the corrugating rollers, which are generally heated to temperatures above 340° F., adhesive is applied to the crests of the corrugated paper flutes and linerboard is applied to form a single faced corrugated medium. If desired, the single faced corrugated medium is then double faced in order to enhance the strength of the corrugated product. A second linerboard is drawn over a preheating roller and joined with the exposed crests of the flutes of the single faced corrugated medium to which adhesive has been applied. The double faced corrugated medium is the passed over a heated medium or hot plate section while subjected to pressure from a weight roller and belt assembly above the hot plate section.

One problem in a conventional corrugating system is the occurrence of malformed flutes in the corrugated medium. When the corrugating medium is passed through the corrugating rolls, the corrugations are formed as the medium is pressed in the nip of the corrugating rolls under the application of heat and pressure to form flutes. A low flute occurs when the flute does not fully form in the nip of the corrugating rolls. The results of uneven amplitudes of the flutes are areas of little or no contact between the linerboard applied to the crests of the corrugated medium in subsequent double facing operations, thus forming a flawed corrugated product.

Another problem occurs when the flutes are deformed during subsequent processing. The main processing areas at which deformation occurs are in the removal of the corrugated medium from the corrugating rolls and in the hot plate section of a double facing system. Deformation during removal of the corrugated medium from the corrugating rolls results primarily from the inability of the corrugated medium to properly release from the corrugating rolls after the application of heat and pressure in the nip of the rolls.

Deformation also frequently occurs in the hot plate section of a double facing operation. When the second linerboard is applied to the adhesive on the exposed crests of the flutes of the single faced corrugated medium the resulting double faced corrugated medium is then passed over a hot plate section with pressure applied from a belt and weight roller assembly above the hot plates in order to cure the adhesive and to dry the paperboard. A high coefficient of friction between the hot plate section and the face of the linerboard results in deformed corrugation flutes as the double faced corrugated medium is subjected to shear forces between the roll press and the hot plate section surfaces.

The paperboard available in today's market is frequently recycled paper and it is expected that more recycled material will be supplied in the future. This recycled paper retains some undesirable additives and also is not always treated with a finishing agent. The result is a paperboard which obtains a high coefficient of friction when passed over the hot plates, thereby aggravating the flute deformation problem.

A high shear force in the double faced corrugated medium also produces a loss of strength in the adhesive bond between the second linerboard and the crests of the flutes of the corrugated medium. The adhesive bond for the second linerboard is not set when the double faced corrugated medium enters the hot plates and high shear forces can break the initial bond so that slippage occurs between the second linerboard and the corrugated medium.

The result of malformed or deformed flutes is a reduction in the strength of the corrugated product. In today's market, corrugated products are generally manufactured to conform to various industry and government specifications. The loss in product quality resulting from such malformed and deformed flutes results in rejected goods, customer complaints, and returned shipments.

One way in which both of the above problems have been solved according to the prior art is to run the corrugating system at a low rate of production. This low rate of production is, however, significantly below the speeds at which the corrugating machines are capable of operating and is basically an unsatisfactory method for solving the problem. Obviously, a higher rate of production results in a more cost competitive product.

In addition, the prior art has attempted to solve the flute malformation problem by the use of various lubricants applied to the corrugating medium or to the corrugating rolls. As shown in U.S. Pat. Nos. 1,796,542, 3,676,247, and 3,103,459, the lubricants chosen are generally of a hydrocarbon base such as paraffin, wax, or polyethylene. Such hydrocarbon base lubricants have been applied in liquid form or have been formed as a solid, the use of a wax in solid bar form often being applied to the paper stock or to the crests of the corrugating rolls. These lubricants reduce the coefficient of friction between the paperboard and the corrugating rolls and do indeed result in some improvement in flute formation and higher operating speed. However, the use of such hydrocarbon lubricants results in additional problems. Such lubricants have a tendency to be absorbed by the paperboard or linerboard with a resulting discoloration of the paperboard or linerboard. The hydrocarbon lubricants also tend to vaporize in an oily smoke under the operating temperatures of the corrugating rolls and the hot plates. This oil vapor can result in unacceptable concentrations of hydrocarbons in the shop atmosphere. U.S. Pat. No. 3,676,247 further discloses a lubricant containing stearins for use in an unheated or low heat corrugating system but the wax base provided for the lubricant would be unacceptable in a heated system for the reasons discussed above.

It will also be noted from the references that the lubrication is applied to either the corrugating medium itself or to the crests of the flutes of the corrugating rolls. The lubrication, when applied to the corrugating rolls, is thus only a topical application and is not evenly distributed in the flutes of the corrugating rolls.

It should be noted that paper and paperboard has been treated with various products such as metallic stearates to impart a finish or waterproofing to such paper products as typically shown in U.S. Pat. No. 2,029,390. Metallic stearates have also been used as release agents in metal casting and plastic molding operations. Such agents have not heretofore been applied in the paper corrugating industry to improve corrugating system performance.

The disadvantages of the prior art are overcome in the present invention, however, and improved methods and apparatus are provided for forming a double faced corrugated medium that increases production rates with improved flute formation and reduced equipment operating costs.

SUMMARY OF THE INVENTION

In a preferred embodiment of the present invention, a web of a corrugating medium is supplied to heated corrugating rolls to which a water mist carrying a solid lubricant as a release agent has been applied evenly over the rolls, a first linerboard is glued to one side of the corrugated medium, a second linerboard is passed over a preheating roller to which a solid lubricant is applied via a water suspension sprayed on the preheating roller, the second linerboard is glued to the single faced corrugated board and the resulting double faced corrugated paperboard is passed over a hot plate section while subjected to pressure from a belt and weight roller assembly from above the hot plates.

The water mist is applied evenly to the corrugating rolls just ahead of the nip of the rolls and is transformed into steam which operates on the fibers of the corrugating medium in the nips of the corrugating rolls to provide improved flute formation and impart a cushioning effect between the corrugating rolls. A solid lubricant which acts as a release agent is carried by the water mist and evenly applied over the flutes of the corrugating rolls to improve separation between the corrugated medium and the corrugating rolls. The solid lubricant applied in a water suspension to the preheating roll for the second linerboard is transferred to the linerboard surface and acts to reduce the friction between the second linerboard and the heated surfaces of the hot plate section as the resulting double faced corrugated paperboard passes between the belt and weight roller assembly and the hot plates. By using a solid lubricant not having a hydrocarbon base in a water suspension, there is no resulting discoloration of the linerboard or objectionable vapors.

A principal feature of the present invention is to provide for the manufacture of corrugated paperboard at the maximum equipment production capabilities.

Another feature of the invention is to provide for the manufacture of corrugated paperboard with high quality flute formation at maximum equipment production capabilities.

Still another feature of the invention is to provide for release of the corrugated medium from the corrugating rolls without deformation of the flutes during operation of the corrugating equipment at maximum production capabilities.

Yet another feature of the invention is to pass double faced corrugated paperboard over hot plates under pressure without causing deformation of the flutes or separation between the second linerboard and the corrugated medium.

An advantage of the present invention is decreased impact at the nip of the corrugating rolls due to the cushioning effect of the steam produced from the applied water mist with a resulting increase in corrugating roll life and decrease in noise level.

Another advantage of the present invention is increased life for the corrugator hot plates and belt drive assembly due to reduced friction between the linerboard and the hot plates.

Yet another advantage of the present invention is a reduction in the loose paper fibers resulting from the friction between the second linerboard and the hot plates, thereby yielding reduced airborne paper dust and paper dust build up in the equipment.

Still another advantage of the invention is a reduced power requirement for the hot plate belt and weight roller assembly and corrugating rolls from the enhanced separation and reduced friction.

Another advantage of the present invention is the elimination of the contaminating effect of airborne hydrocarbon vapors which result from the use of hydrocarbon base lubricants.

BRIEF DESCRIPTION OF THE DRAWINGS

In order that the manner in which the above-recited advantages and features of the invention are obtained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting in scope, for the invention may admit to equally effective embodiments.

In the drawings.

DETAILED DESCRIPTION OF THE PREFERRED EMBODIMENTS

Figure 1:
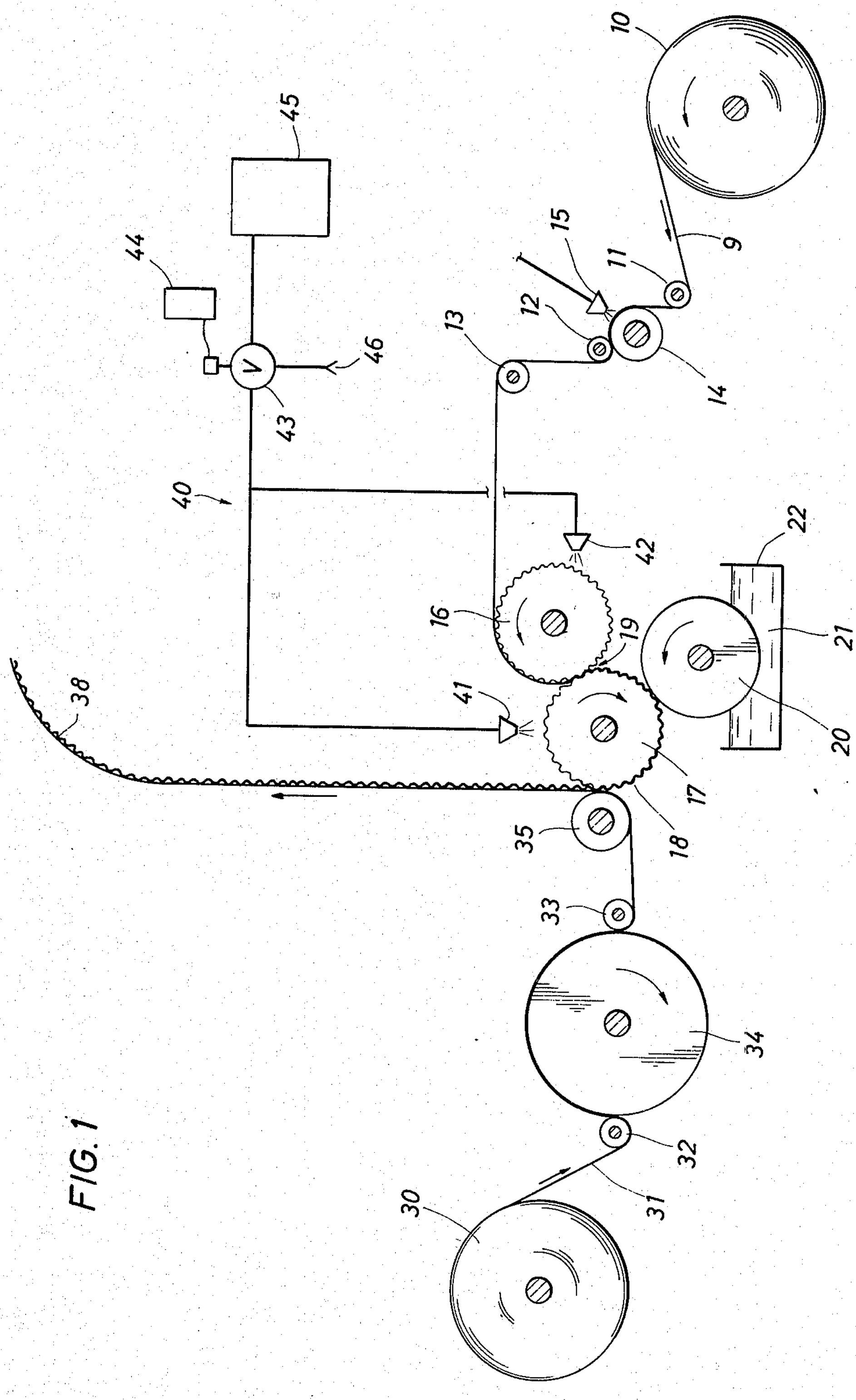
FIG. 1 is a simplified schematic illustration of a basic corrugator single facer.

Referring now to FIG. 1, there may be seen a simplified illustration of a basic corrugator single facer. More particularly, corrugating medium 9 is drawn from roll 10 around guide roller 11 and over bottom steam conditioner 14. Corrugating medium 9 is conditioned by first applying steam to corrugating medium 9 through bottom conditioner 14 so as to evenly condition corrugating medium 9. Corrugating medium 9 is further conditioned by the application of a top steam shower through top conditioner 15 to further ensure an even conditioning of corrugating medium 9. Corrugating medium 9 is then drawn around guide rolls 12 and 13 onto first corrugating roll 16. Corrugating roll 16 may be internally heated by steam to an operating temperature of around 360° F. Temperatures of corrugating rolls 16 and 17 may vary but are generally at least above 300° F. Corrugating medium 9 the passes between first corrugating roll 16 and second corrugating roll 17 and is pressed into the corrugating roll flutes with maximum pressure occurring at the nip region 19, the point of closest contact between first corrugating roll 16 and second corrugating roll 17, so as to conform to the contours of corrugating rolls 16 and 17. After passing through the nip 19, corrugating medium 9 releases from first corrugating roll 16 and is carried by the second corrugating roll 17 into contact with adhesive roll 20. Adhesive roll 20 picks up adhesive 21 from adhesive tank 22 so as to apply adhesive 21 to the crests of the flutes as now exist on the corrugated medium 18.

Water atomizing system 40 is provided to aid in flute formation and release of corrugated medium 18 from corrugating rolls 16 and 17. Water atomizing system 40 consists of one or more water jet nozzles 41 which act to evenly apply a fine mist of water to corrugating roll 17 before corrugating roll 17 enters the nip 19, and one or more water jet nozzles 42 which act to evenly apply a fine mist of water to corrugating roll 16 before corrugating medium 9 passes onto corrugating roll 16. Water atomizing system 40 further comprises valve 43 and valve actuating means 44 for providing a means to connect the nozzles 41 and 42 to water supply 46 or to means for maintaining a solid lubricant in a water suspension 45. Water atomizing system 40 is thereby capable of injecting a fine mist of plain water through water jet nozzles 41 and 42 or for injecting a water suspended solid lubricant through water jet nozzles 41 and 42. For single facing, a first linerboard 31 is drawn from roll 30 over guide roller 32 and is preheated by passing over facing preheater 34. Facing preheater 34 is generally maintained at a temperature above 300° F. Linerboard 31 then passes around guide roll 33 and between heated pressure roll 35 and corrugating roll 17 where the first linerboard 31 is pressed against the crests of the adhesive coated flutes of corrugated medium 18 and secured thereto by adhesive 21. Pressure roll 35 is additionally maintained at a temperature at least above 300° F. for causing sufficient heat to set adhesive 21 and secure linerboard 31 to corrugated medium 18. Typically, a temperature range of 340° to 370° F. is maintained.

The production capability of generally available corrugator single facer equipment is about 400–650 feet per minute (fpm), however the production rate actually achieved is considerably less than this when conventional techniques are used. Water atomizing system 40 is provided to enable the system production rate to achieve its mechanical capabilities. A fine water mist is uniformly and evenly added to corrugating rolls 16 and 17 by water jet nozzles 41 and 42 to aid in flute formation as corrugating medium 9 passes to the nip 19 of corrugating rolls 16 and 17. The applied moisture is carried into the nip region 19 by corrugating rolls 16 and 17, generally in the form of steam as a result of the high operating temperatures of corrugating rolls 16 and 17, and provides for the application of steam at the exact place where flute formation occurs in corrugating medium 9, that is, in the nip 19 of corrugating rolls 16 and 17. This simultaneous application of heat, steam, and pressure greatly enhances the flute formation and reduces the malformation of flutes even at higher operating speeds.

Additionally, a means for maintaining a solid lubricant in a water suspension 45 is connected to water jet nozzles 41 and 42 by valve 43 whereby solid lubricant can also be injected onto corrugating rolls 16 and 17. The solid lubricant is generally from a class consisting of metallic stearates, collodial graphite and collodial molybdenum disulfide, obtaining lubricating and release properties from their small particulate size, generally 1–4 microns, or a size capable of suspension in water and adapted for spray application with water. The solid lubricants act as release agents for the corrugating medium 9 after it has been passed through the nip of corrugating rolls 16 and 17 rather than performing a lubrication function per se. The proper release between corrugated medium 38 and corrugating rolls 16 and 17 is essential to achieving the high operating speeds desired. The concentration of solid lubricants, required to achieve maximum production operating capability is small, being in the order of one-fourth to one-half percent by weight of water. The maximum concentration is limited by the need to maintain a substantially rough finish on the corrugated medium and to provide for proper adhesive 21 application. The water carrier in which the solid lubricants are suspended vaporizes into steam and passes harmlessly into the atmosphere without being absorbed into the corrugating medium 9 or linerboard 31.

Figure 2:
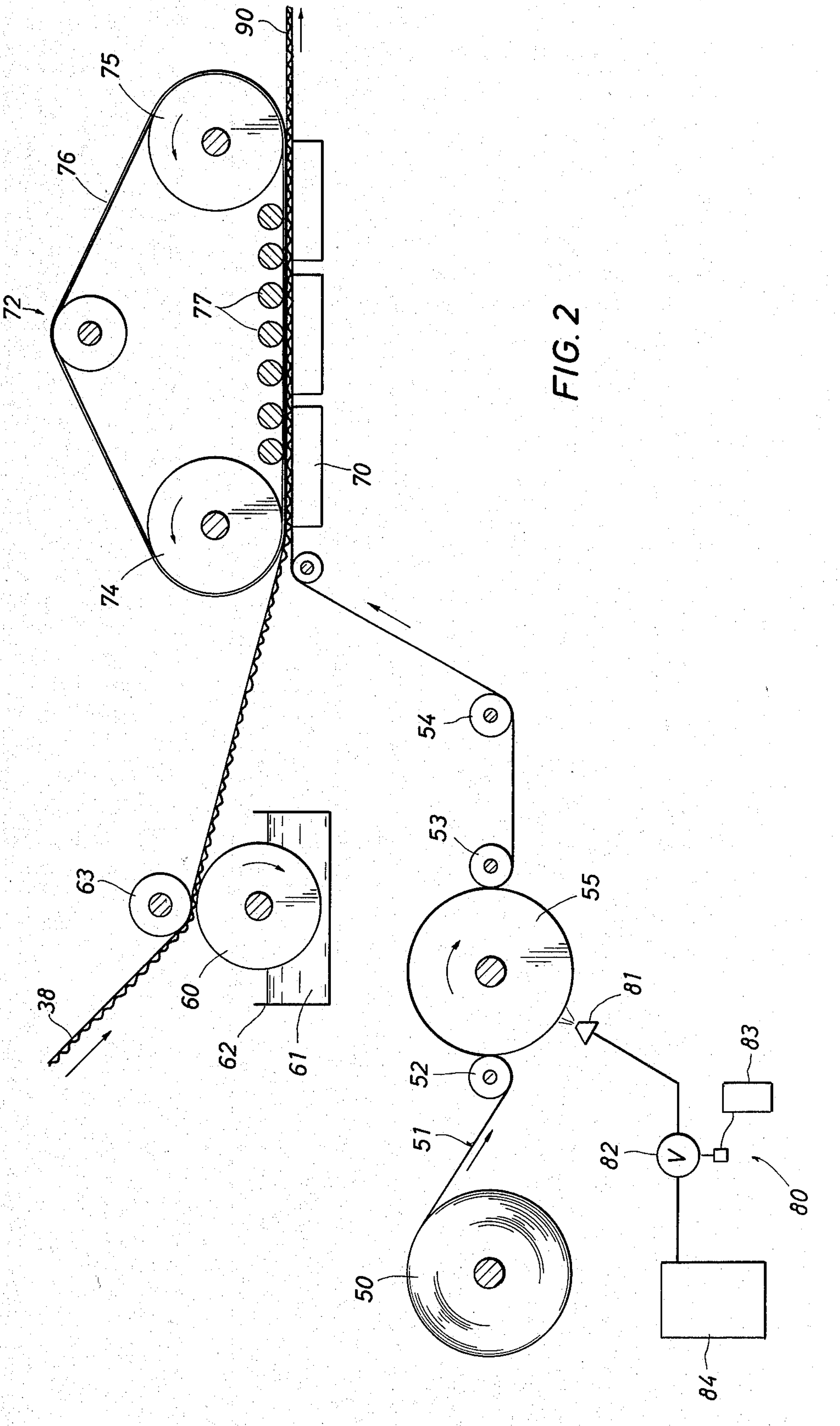
FIG. 2 is a simplified schematic illustration of a basic corrugator double facer.

FIG. 2 is a simplified schematic illustration of a basic corrugator double facer. More particularly, a single faced corrugated medium 38 passes between rider roll 63 and adhesive roll 60, whereby adhesive roll 60 picks up adhesive 61 from adhesive tank 62 and applies adhesive 61 to the exposed crests of the flutes of a single faced corrugated medium 38. A second linerboard 51 is fed from a second roll 50 around guide roll 52 and over facing preheater 55. Water atomizing system 80 applies a fine mist to facing preheater 55 ahead of linerboard 51. Water atomizing system 80 provides for one or more water jet nozzles 81, valve 82, valve actuating means 83 and means for maintaining a solid lubricant in a water suspension 84. Valve actuating means 83 may be programmed to actuate valve 82 at predetermined intervals so as to provide an intermittent spray through jet water nozzles 81. Linerboard 51 picks up the solid lubricant from the surface of facing preheater 55 and passes through guide rolls 53 and 54 and onto the top surface of a hot plate section 70. At the entrance to belt and weight roller assembly 72, linerboard 51 joins with the single faced corrugated medium 38 and is secured thereto by adhesive 61 to form double faced corrugated board 90. Double faced corrugated board 90 then passes between hot plate sections 70 and belt and weight roller assembly 72 where pressure is applied by weight rolls 77 as double faced corrugated board 90 is moved by hot plate belt 76 over hot plates 70 to dry the double faced corrugated board 90 and cure adhesive 61.

As the double faced corrugated board 90 passes over hot plates 70 under the application of pressure from weight rolls 77, a considerable shear force is developed from the retarding frictional forces acting between the surfaces of hot plates 70 and linerboard 51 and the forward frictional and pressure forces applied to the single faced corrugated medium 38 by belt 76 and rollers 74, 75 and 77. These shear forces can result in the deformation of flutes as double faced corrugated board 90 passes over the hot plates 70 or can result in destruction or weakening of the adhesive bond between the single faced corrugated medium 38 and linerboard 51 before adhesive 61 has properly cured. These problems are substantially eliminated in the present invention by the application of a solid lubricant in a water suspension to preheater roll 55. The solid lubricants are from a class consisting of metallic stearates, collodial graphite, collodial molybdenum disulfide and other non-staining solid lubricants. These lubricants are generally applied in low concentrations of between one-fourth and one-half percent by weight of water. The lubricants are maintained in a water suspension by said means for maintaining solid lubricants in a water suspension 84 and are applied through water jet nozzles 81 by the operation of valve 82 as actuated by acutating means 83.

In order to prevent a build-up of solid lubricant on the surface of facing preheater 55, valve 82 is actuated intermittently by a valve actuating means 83 at predetermined intervals. The water carrier is harmlessly vaporized on facing preheater 55, and the solid lubricant is carried onto the surface of linerboard 51 and to the surface of hot plates 70. The solid lubricant then acts to greatly reduce the coefficient of friction between the surfaces of hot plates 70 and linerboard 51, whereby the shear forces are substantially reduced. The reduced coefficient of friction permits the production of double faced corrugated board to proceed at machine capacity rather than the capacity required to prevent flute deformation and liner separation when run in a conventional fashion.

By the application of solid lubricants in a water suspension, the use of various hydrocarbons such as waxes, paraffins and emulsified polyethylenes on the system components and on the paper surfaces has been eliminated. Such hydrocarbon compounds were generally absorbed into the paperboard fibers and often left discernable objectionable residues as the lighter hydrocarbon components vaporized. Further, the vaporization of such hydrocarbon components led to the generation of increased concentrations of hydrocarbon compounds in the atmosphere adjacent the corrugating equipment. The elimination of such hydrocarbon vapors greatly reduces pollution levels in accordance with EPA and OSHA guidelines and directives. Pollution from airborne paper fibers is also reduced as the production of such fibers is minimized by the low frictional forces between the various paper components and the corrugating system components. The maximum concentration of solid lubricants is limited by the need to maintain a finish on the face of corrugated board 90 that will allow proper or normal stacking of the finished product and of corrugated board boxes made from the board.

Numerous variations and modifications may obviously be made in the structure herein described without departing from the present invention. Accordingly, it should be clearly understood that the forms of invention herein described and shown in the figures of the accompanying drawings are illustrative only and are not intended to limit the scope of the invention.

What is claimed is:

1. A method for manufacturing faced corrugated paperboard which comprises the following steps:

continuously supplying a web of single-faced corrugated medium, continuously supplying a web of linerboard, applying a solid lubricant in a carrier medium and in a manner effective to transfer at least a portion of said solid lubricant to one face of said linerboard without transfer of said carrier medium to said one face, applying an adhesive to crests of the flutes of said corrugated medium, securing said linerboard to said corrugated medium to form faced corrugated paperboard, passing said faced corrugated paperboard through a hot plate section for curing said adhesive and drying said faced corrugated paperboard, said lubricated one face of said linerboard contacting the stationary surface of said hot plate section for reducing the coefficient of friction therebetween.

2. The method described in claim 1 wherein the step of applying said solid lubricant includes spraying a preheating roller with a solid lubricant in a water carrier, vaporizing said water carrier on said preheating roller, and passing said linerboard over said preheating roller to transfer a portion of said solid lubricant to said one face of said linerboard.

3. The method described in claim 2, wherein said lubricant is comprised of particles of a size capable of suspension in water and adapted for spray application with water for acting as a lubricant.

4. The method described in claim 3 wherein said solid lubricant is composed of particles of 1–4 micron diameter.

5. The method described in claim 3 wherein said preheating roller is sprayed with a solid lubricant from a group consisting of metallic stearates, colloidal graphite and colloidal molybdenum disulfide carried in a water suspension.

6. The method described in claim 3 wherein said preheating roller is treated with a solid lubricant from a group consisting of metallic stearates, colloidal graphite and colloidal molybdenum disulfide carried in a water suspension, said solid lubricant being applied in concentration less 1.5% by weight of water.

7. The method described in claim 3 including the further step of applying said solid lubricant intermittently to said preheating roller.

8. A method for manufacturing double faced corrugated paperboard which comprises the following steps:

continuously supplying a web of single-faced corrugated medium, applying an adhesive to the exposed crests of the flutes of said corrugated medium, continuously supplying a web of linerboard, supplying a suspension of a solid lubricant in water, said solid lubricant being composed of particles of a size capable of suspension in water and adapted for spray application with water for acting as a lubricant, spraying a preheating roller with said solid lubricant in a water carrier ahead of said linerboard, vaporizing said water carrier on said preheating roller, passing said linerboard over said preheating roller for transfer of a portion of said solid lubricant to said one face of said linerboard, securing said linerboard to said corrugated medium to form double faced corrugated paperboard, passing said double faced corrugated paperboard through a hot plate section in which said lubricated one face of said linerboard contacts the stationary surfaces of said hot plate section for reducing the coefficient of friction therebetween.

* * * * *

UNITED STATES PATENT AND TRADEMARK OFFICE

CERTIFICATE OF CORRECTION

PATENT NO. 4,278,486

DATED July 14, 1981

INVENTOR(S) : Edward H. Schrader

It is certified that error appears in the above-identified patent and that said Letters Patent are hereby corrected as shown below:

Column 1, line 29, "medium is the" should be --medium is then--;

Column 4, line 60, "medium 9 the passes" should be --medium 9 then passes--;

Column 8, line 31, "less 1.5%" should be --less than 1.5%--.

Signed and Sealed this

*Seventeenth* Day of *November 1981*

[SEAL]

*Attest:*

GERALD J. MOSSINGHOFF

*Attesting Officer* *Commissioner of Patents and Trademarks*